(12) United States Patent
Telefus et al.

(10) Patent No.: US 6,707,285 B2
(45) Date of Patent: Mar. 16, 2004

(54) PHASE-CONTROLLED AC-DC POWER CONVERTER

(75) Inventors: Mark D. Telefus, Orinda, CA (US); Dickson T. Wong, Burlingame, CA (US)

(73) Assignee: Iwatt, Los Gatos, CA (US)

( * ) Notice: Subject to any disclaimer, the term of this patent is extended or adjusted under 35 U.S.C. 154(b) by 178 days.

(21) Appl. No.: 10/041,664

(22) Filed: Jan. 10, 2002

(65) Prior Publication Data
US 2002/0109487 A1 Aug. 15, 2002

Related U.S. Application Data
(60) Provisional application No. 60/261,099, filed on Jan. 10, 2001.

(51) Int. Cl.[7] .................................. G05F 1/40
(52) U.S. Cl. ....................................... 323/300
(58) Field of Search ......................... 323/299, 300, 323/303, 272, 282; 363/34, 44, 65, 71, 72, 78–80, 95, 97

(56) References Cited

U.S. PATENT DOCUMENTS

| | | | | |
|---|---|---|---|---|
| 4,689,548 A | * | 8/1987 | Mechlenburg | 323/243 |
| 5,712,774 A | * | 1/1998 | Uramoto | 363/46 |
| 6,104,177 A | * | 8/2000 | Fritsch et al. | 323/300 |
| 6,178,101 B1 | * | 1/2001 | Shires | 363/39 |
| 6,208,113 B1 | | 3/2001 | Lelkes et al. | |
| 6,404,173 B1 | * | 6/2002 | Telefus | 323/272 |
| 6,495,996 B1 | * | 12/2002 | Redlich | 323/300 |
| 6,531,854 B2 | * | 3/2003 | Hwang | 323/285 |

FOREIGN PATENT DOCUMENTS

| | | |
|---|---|---|
| EP | 0 596 152 A1 | 5/1994 |
| EP | 0 989 666 A1 | 3/2000 |

OTHER PUBLICATIONS

Non–Certified translation made of European Patent No. 0598 152 A1; Applicant: Trllux–Lenze GmbH & Co. KG, 20 pages.

* cited by examiner

Primary Examiner—Matthew V. Nguyen
(74) Attorney, Agent, or Firm—Bingham McCutchen LLP

(57) ABSTRACT

An AC to DC power converter, comprising an input, an output, a plurality of pass elements connected in parallel between the input and output, and a controller for switching ON a subset of the plurality of pass elements. The controller sets an ON time for at least one pass element in the subset based on a load at the output and a phase angle of an input voltage at the input. The input voltage may comprise a single or multi-phase signal. The number of pass elements in the subset is based on the load. In one embodiment, each pass element comprising a pair of series-connected field effect transistors coupled source to source and operated in fully enhanced mode.

19 Claims, 13 Drawing Sheets

OUTPUT VOLTAGE VS. TIME

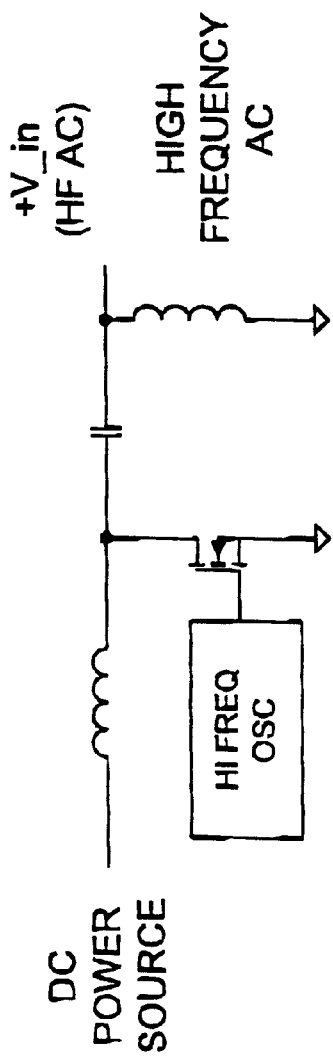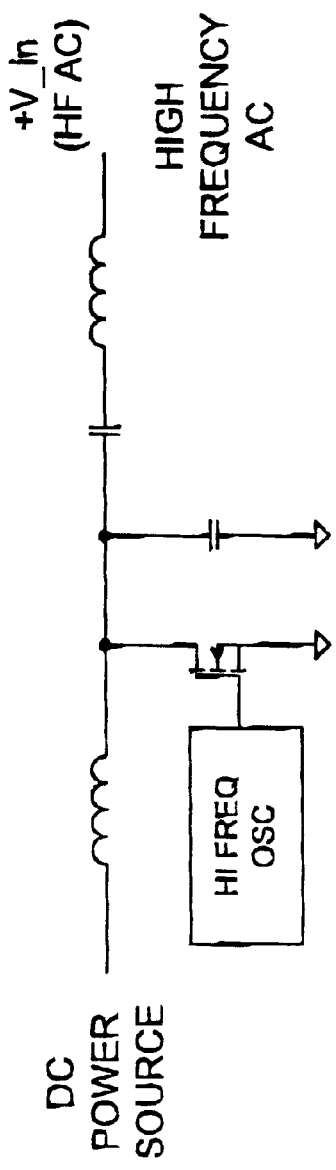
FIG. 10A -- PARALLEL RESONANT
FIG. 10B -- SERIES RESONANT

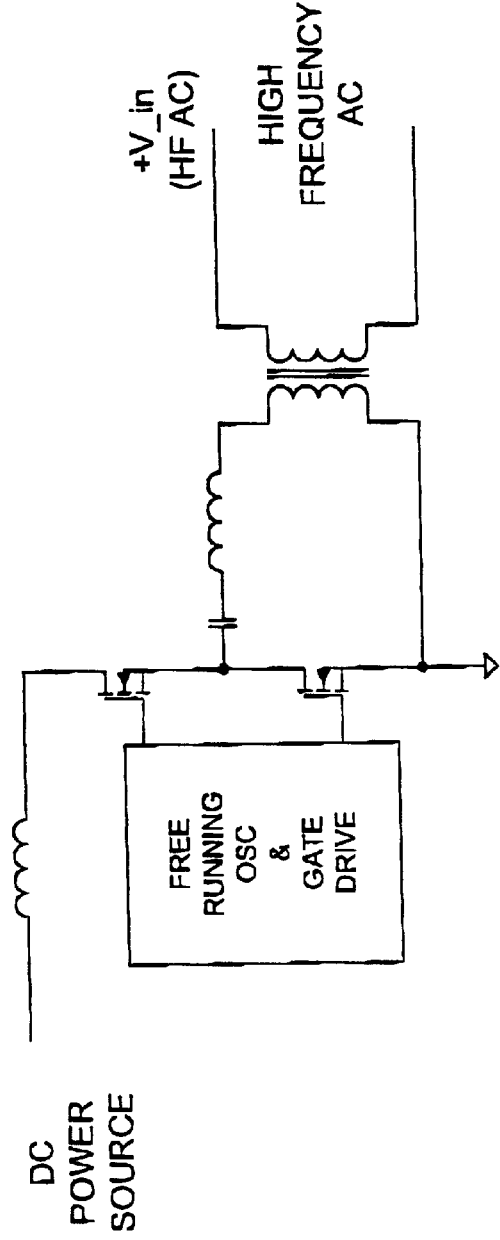
FIG. 11A -- HALF BRIDGE
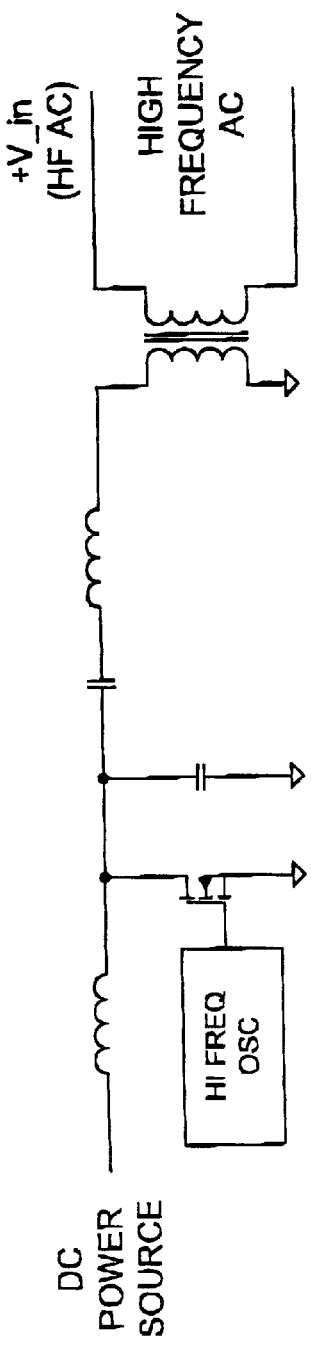
FIG. 11B -- SINGLE SWITCH SERIES RESONANT

PHASE-CONTROLLED AC-DC POWER CONVERTER

RELATED APPLICATION DATA

This application is related to, and hereby claims priority on U.S. Provisional Application Ser. No. 60/261,099, filed Jan. 10, 2001. This application is also related to, and hereby claims priority on co-pending U.S. application Ser. No. 09/627,953, now U.S. Pat. No. 6,404,173. Both of these related applications are hereby fully and expressly incorporated by reference for all that they teach and disclose.

FIELD OF THE INVENTION

This invention pertains generally to the field of electronic power converters and, more particularly, to relatively low-voltage, high current power converters, e.g., for personal computer power supplies.

BACKGROUND

As the clock speed of microprocessors continues to increase, so does the demand for operating power. Operating voltages are decreasing, increasing the current necessary to meet the power demand at higher and higher levels. Standard microprocessors now have clock speeds in excess of 1 GHz, with operating voltages below 2.0 volts. The current demand for operating at these frequencies and voltages can exceed 100 amperes. In addition, current slew rates are anticipated which exceed 100 amperes per microsecond. These requirements exceed the capability of existing, mass produced computer power supplies. For example, previous attempts to stack multiphase buck converters to meet the increased current demand have largely failed to meet the slew rate requirements.

FIG. 1 shows a simple prior art power converter 50 that converts AC power from a source 40 into a controlled DC output voltage 45 using a phase angle switching controller 41 with a silicon controlled rectifier (SCR) diode 43. The SCR diode 43 operates like a rectifier with a gate that triggers conduction when the anode is positive with respect to the cathode. In particular, unless the gate of the SCR diode 43 is activated, current will not flow through it even if it is positively biased. On the other hand, once conduction is triggered, i.e., by both a positive bias and activation of the gate, the SCR 43 is latched ON and continues to conduct until the polarity reverses and the cathode is positive with respect to the anode, regardless of whether the gate continues to be activated.

The converter circuit operates as a half wave rectifier, where the input voltage (47) phase angle conduction trigger point is controlled. During a positive half cycle, when the input voltage 47 is positive with respect to ground, conduction in the SCR 43 is triggered at varying phase angles. The controller 41 senses the output voltage 45, and determines when to trigger conduction in the SCR 43 in order to keep the output voltage 45 close to a desired voltage. If the output voltage 45 sags, e.g., as a result of heavy load conditions, the controller 41 will respond by initiating conduction at an early phase angle in the input voltage 47. Conversely, if the output voltage 45 remains high, e.g., as a result of light load conditions, the controller 41 will respond by initiating conduction at a late phase angle.

FIG. 2 illustrates this concept and associated voltage wave forms. During a first positive half cycle 51 of the input voltage (47), the SCR 43 remains OFF through most of this half cycle, representing a light load condition. Conduction is triggered late, illustrated at trigger point 52 of approximately 135 degrees, and the output voltage 45 sags. During the second half cycle 53 of the input voltage (47), the SCR 43 is ON through most of this half cycle, representing a heavy load condition. Conduction is triggered early, at trigger point 54 of approximately 30 degrees, and the output voltage 45 is increased. Thus, the output voltage 45 is regulated by varying the phase angle of the conduction trigger point.

SUMMARY OF THE INVENTION

In accordance with a first aspect of the invention, a power converter is provided, comprising an input, an output, a pass element connected between the input and output, and a controller that switches the pass element ON and OFF at phase angles of an AC input voltage received at the input in order to regulate a DC output voltage at the output. The input voltage may comprise a single or multi-phase signal.

In one embodiment, the controller switches the pass element ON at a first selected phase angle, and OFF at a second selected phase angle, the first and second phase angles determined by the controller based on the output voltage.

In one embodiment, the pass element comprises a pair of series-connected field effect transistors coupled source to source and operated in fully enhanced mode.

In one embodiment, the power converter comprises a plurality of pass elements connected between the input and output, the controller switching respective pass elements ON and OFF independent of each other, wherein the number of pass elements switched ON by the controller is based on the output voltage. In accordance with one aspect of this embodiment, the controller is preferably configured to determine the phase angles for switching the respective pass elements ON and OFF based at least in part on balancing current through the respective pass elements.

In accordance with another aspect of the invention, a method of regulating power using an AC to DC converter is provided, the power converter comprising an input, an output, and a pass element connected between the input and output, the method comprising switching the pass element ON and OFF at phase angles of an AC input voltage received at the input in order to regulate a DC output voltage at the output.

In one embodiment, the pass element is switched ON at a first selected phase angle, and switched OFF at a second selected phase angle, the first and second phase angles determined based on the output voltage.

In one embodiment, the converter comprises a plurality of pass elements connected between the input and output, the method further comprising switching respective pass elements ON and OFF independent of each other. In accordance with an aspect of this embodiment, the number of pass elements switched ON is based on the output voltage, and the phase angles for switching the respective pass elements ON and OFF is based at least in part on balancing current through the respective pass elements.

Other and further aspects and features of the invention and embodiments of the invention are shown and described in the accompanying figures and description thereof.

BRIEF DESCRIPTION OF THE DRAWINGS

The drawings illustrate both the design and utility of preferred embodiments of the present invention, in which similar elements in different embodiments are referred to by the same reference numbers for purposes of ease in illustration, and wherein:

FIG. 10a is a schematic diagram of an exemplary parallel resonant, non-isolated DC-AC inverter for use in the above embodiments.

FIG. 10b is a schematic diagram of an exemplary series resonant, non-isolated DC-AC inverter for use in the above embodiments.

FIG. 11a is a schematic diagram of an exemplary half-bridge resonant, isolated DC-AC inverter for use in the above embodiments.

FIG. 11b is a schematic diagram of an exemplary single switch, series resonant, isolated DC-AC inverter for use in the above embodiments.

DETAILED DESCRIPTION OF PREFERRED EMBODIMENTS

Figure 1:
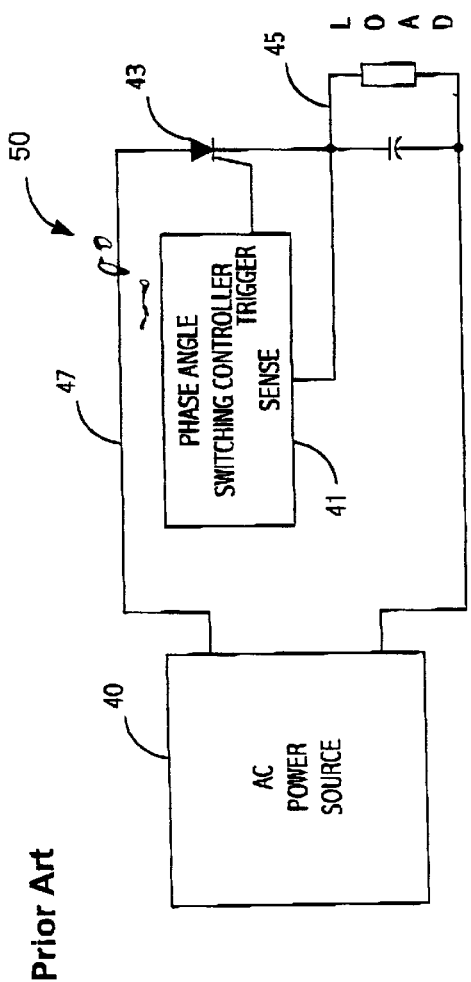
FIG. 1 is a schematic diagram of a prior art AC-DC converter using a phase angle switching controller with a silicon controlled rectifier (SCR).
Figure 2:
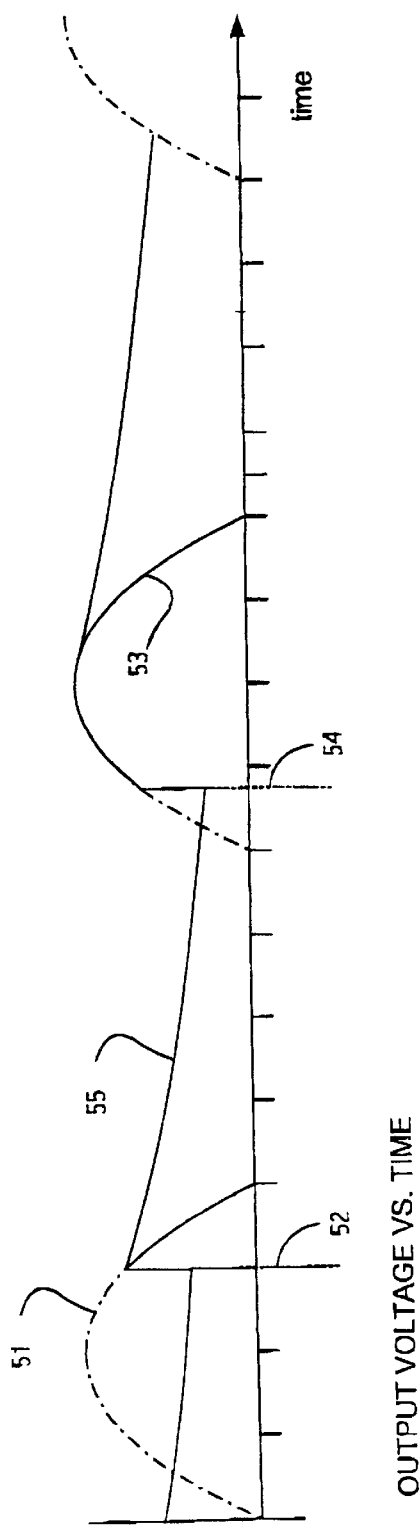
FIG. 2 shows voltage waveforms of the converter of FIG. 1.
Figure 3B:
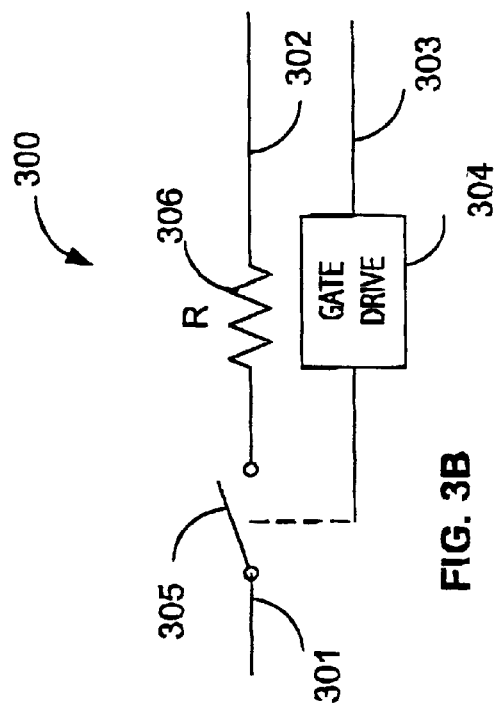
FIG. 3B is a circuit schematic diagram of the pass element embodiment of FIG. 3A.
Figure 3A:
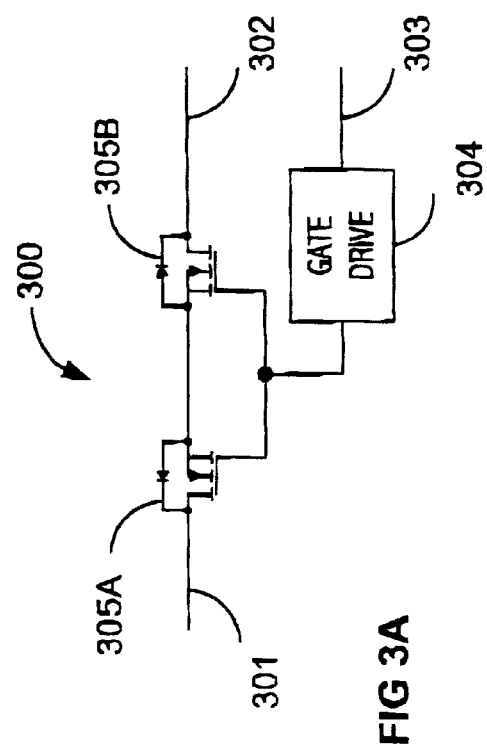
FIG. 3A is a schematic diagram of one embodiment of a pass element used in embodiments of the invention.

FIG. 3A illustrates a preferred embodiment of a pass element (PE) 300, comprising a pair of series connected field effect transistors (FETS) 305A and 305B. In particular, the FETs 305A and 305B comprising the pass element 300 are coupled source to source. The pass element has a first terminal 301, a second terminal 302, and a gate terminal 303. The pass element 300 can withstand a voltage drop across the first and second terminals 301 and 302 applied in either sense, and can allow current to flow in either direction if the gate terminal is activated. The FETs 305A and 305B used to implement a pass element are operated as switches in the fully enhanced mode, causing the FETs 305A and 305B to quickly and efficiently turn ON and OFF.

As is well known in the art, it may be necessary to provide gate drive circuits for each FET 305A and 305B to enable the fast and efficient operation of the respective FET gates in the enhanced mode.

Referring to the accompanying simple circuit model shown in FIG. 3B, turning ON the gate signal causes a the pass element (shown as a switch) 305 to close, allowing current flow between the first terminal 301 and the second terminal 302 through a channel resistor 306. Because the FETS 305A and 305B are coupled source-to-source, when the gate signal is OFF, no parasitic conduction through the channel resistor 306 is possible.

Figure 4:
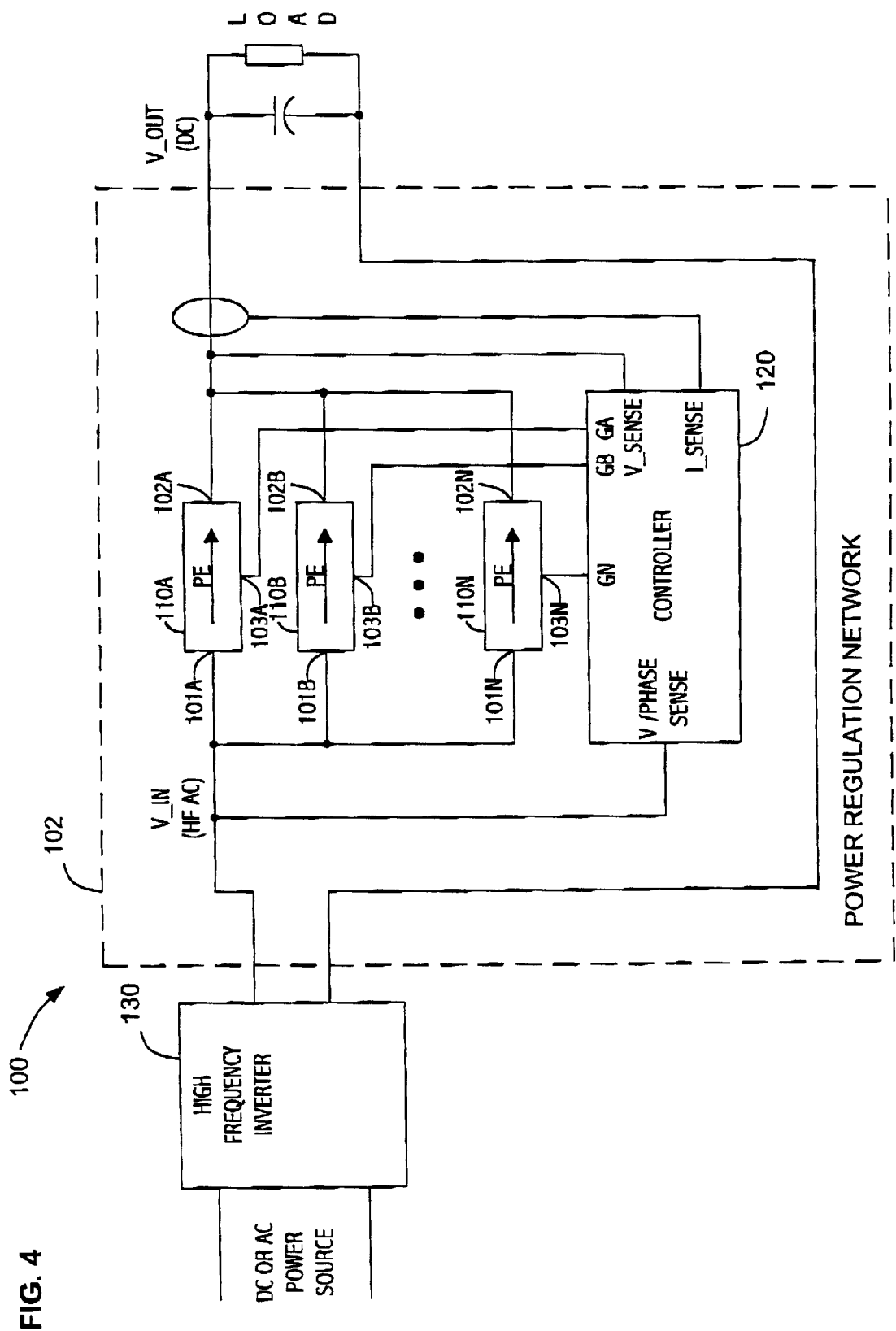
FIG. 4 is a schematic diagram of a AC-DC phase-controlled power converter, according to one embodiment of the invention.

FIG. 4 illustrates the basic architecture for a high current, low voltage power converter 100, in accordance with a general aspect of the invention. The converter 100 generally includes a high frequency inverter 130 and a power regulation network 102. The power inverter 130 converts power from a DC or AC power source into a high frequency AC (HF AC) input voltage source. The power regulation network 102 receives the HF AC input voltage and produces a regulated DC output voltage to a load at a relatively high current.

The power inverter 130 illustrated in FIG. 4 can be any of a number of known circuit topologies, including half bridge, single switch, and push-pull topologies. The inverter can be resonant or non-resonant, transformer coupled or direct coupled. Those of ordinary skill in the art will appreciate that numerous alternative inverter circuit topologies can be used, some of which are illustrated in subsequent figures. Exemplary inverter topologies are illustrated in FIGS. 10–14, but are not intended to be limiting as to the possible inverter topologies.

The power regulation network 102 has a controller 120, which generates control (gate) signals 103A–N applied to the respective gates of each of a plurality of pass elements 110A–N. The individual pass elements 110A–N are preferably the same as the pass element 300 described in FIGS. 3A and 3B, although other physical embodiments having the same functionality are possible. The respective gate signals 103A–N determine when each pass element 110A–N is ON or OFF.

The controller 120 preferably receives measurements of the input voltage, $V_{IN}$, and output voltage, $V_{OUT}$, and also senses the current output to the load. Notably, the voltage at the respective first (in this case, input) terminal 101A–N of pass elements 110A–N is at $V_{IN}$ and the voltage at the second (in this case, output) terminals 102A–N is at $V_{OUT}$. The controller 120 uses these measured and/or sensed signals to control the ON and OFF timing of each respective pass element 110A–N in order to achieve power rectification and regulation functions.

The power regulation network 102 as depicted in FIG. 4 has a circuit topology that is configured for half wave rectification. This configuration was selected for ease of illustration of the rectification and control concepts in accordance with the invention. Those of ordinary skill in the art will appreciate that numerous alternative half-wave and full-wave circuit topologies can also be used within the scope of the invention, some of which are illustrated in subsequent figures.

Rectification is achieved by ensuring that the respective gate signal 103 for each pass element 110 is only ON for one "sense" of the voltage drop across the respective pass element and must be OFF for the opposite sense. Since each pass element 110 is symmetrical with respect to the first and second terminals 101 and 102, their roles are interchangeable. For the purpose of illustration in the preferred embodiments, however, it is assumed that the controller 120 will only command an ON state for a particular pass element 110 when its first terminal 101 is positive with respect to its second terminal 102. The controller 120 measures the voltage across the pass elements 110A–N and generates respective gate drive signals 103A–N for each passs element, which allows current to flow in one direction only (rectification).

Regulation is achieved using a combination of two control strategies: incremental regulation and phase control. In the power regulation network 102 of converter 100, incremental activation of the respective pass elements 110A–N is employed to achieve coarse control over the output voltage $V_{OUT}$. Incremental regulation functions by responding to increased current demand by switching ON more of the pass elements 110A–N, which provide more parallel conduction paths, thereby reducing the resistance of the conduction path between $V_{IN}$ and $V_{OUT}$. Fine control of the output voltage is achieved with individually controlled ON and OFF cycling of one or more of the same, or additional, ones of the pass elements 110A–N. In accordance with a first aspect of the invention, this is accomplished by providing a controller that switches the one or more pass elements ON and OFF at phase angles of the HF AC input voltage $V_{IN}$ in order to regulate a DC output voltage at the output. Notably, $V_{IN}$ may be a single or multi-phase signal.

In particular, according to the incremental regulation strategy, a variable number of the pass elements 110A–N share the total current delivered to the load, depending on which ones are ON. By way of illustration, for light load conditions, only one pass element, e.g., pass element 110A, may be ON, with a series resistance of Rs. As the load increases, a second pass element, e.g., 110B, is turned ON, reducing the effective series resistance to Rs/2. With further increases in load demand, additional ones of the pass elements 110C–N are turned ON, reducing the effective series resistance to Rs/M, where M is the total number of pass elements that are ON at the time.

Recall that the rectification function of the controller 120 requires that the respective pass elements 110A–N be OFF during periods when the voltage at the first terminal 101 is less than the voltage at the second terminal 102. In the illustrated embodiment of FIG. 4, is assumed that the pass elements 110A–N involved in incremental control are ON for the entire period that the voltage at the respective first terminals 101A–N is greater than the voltage at the second terminals 102A–N. In alternate embodiments, one, some, or all pass elements involved in incremental control are also involved in fine control of the output voltage. For example, it may be desirable in some embodiments to balance the current passing through the respective pass elements by employing up to all pass elements in the fine control process.

As noted above, fine control of the output voltage is achieved by controlling the phase of the ON and OFF timing of one or more of the pass elements 110A–N. For example, continuous control of the output voltage can be achieved for the gap between successive increments of the incremental control strategy by continuously controlling the ON and OFF timing of even a single pass element, although multiple pass elements can be involved in the phase control strategy. For the purpose of illustration, the phase control concept will first be explained as though only a single pass element was involved.

During a conduction period (i.e., the period when the voltage at a respective pass element first terminal 101 is greater than the voltage at the respective pass element second terminal 102) the duty cycle of an additional pass element can be varied from 0% to 100%. This provides an additional conduction path to the load, which effectively varies from 0 to 1 pass elements, respectively, thus filling the gap between increments. For example, if M pass elements are switched ON by the incremental control strategy and the phase controlled pass elements are set to 0%, the current to the load would effectively flow through M conduction channels. If M pass elements were switched ON by the incremental control strategy and the phase controlled pass elements are set to 100%, then current to the load would effectively flow through M+1 conduction channels. Similarly, for duty cycles set between 0% and 100%, the effective number of conduction channels can be continuously varied to intermediate values between M and M+1.

Figure 5:
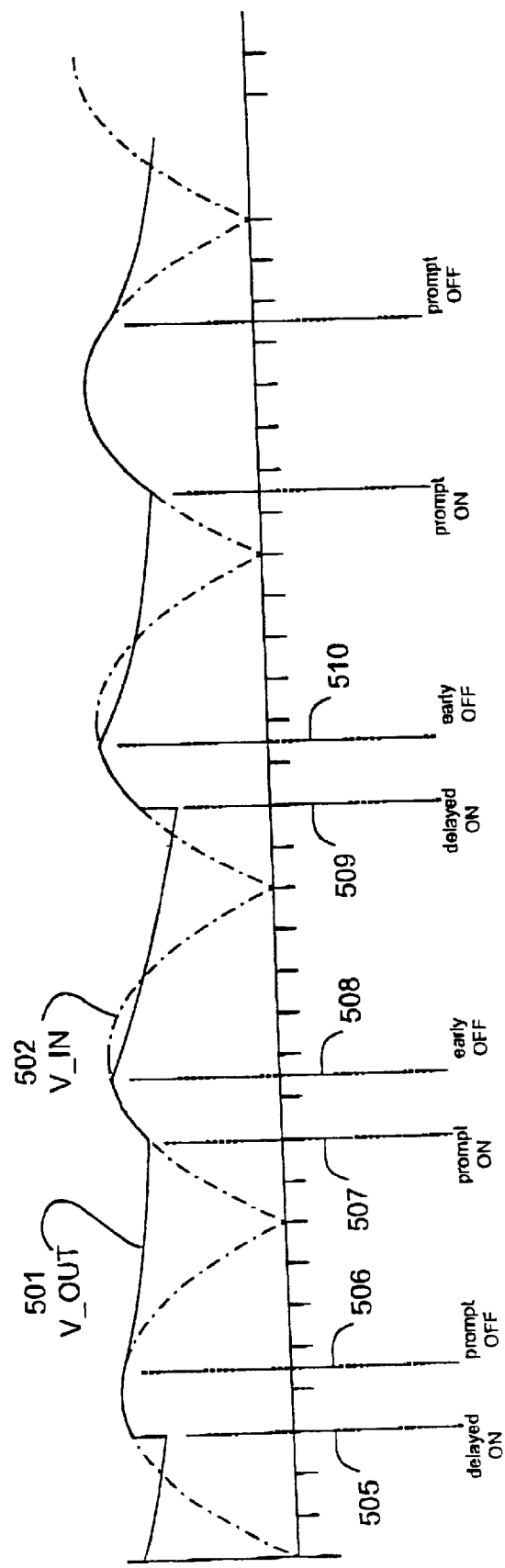
FIG. 5 shows voltage waveforms of the converter of FIG. 4.

FIG. 5 illustrates alternative timing choices for the controller 120 to adjust the duty cycle of a so-called "phase-controlled" pass element 110. Onset of conduction can begin any time after the input voltage $V_{IN}$ 501 exceeds the output voltage $V_{OUT}$ 502. Conduction that begins immediately as this event occurs will be called "PROMPT ON", and conduction which is delayed some period of time after this event will be called "DELAYED ON." Similarly, conduction must be terminated when $V_{IN}$ drops below $V_{OUT}$. Conduction that is terminated prior to this event will be called "EARLY OFF" and conduction terminated immediately as this event occurs will be called "PROMPT OFF".

The first cycle of FIG. 5 illustrates phase control in with DELAYED ON 505 and PROMPT OFF 506. The duty cycle and consequently the effective channel resistance are continuously varied by varying the delay time to DELAYED ON 505. Similarly, the second cycle of FIG. 5 illustrates phase control with PROMPT ON 507 and EARLY OFF 508, where control of the duty cycle is achieved by varying the EARLY OFF 508 timing. The third cycles illustrates yet another phase control strategy with DELAYED ON 509 and EARLY OFF 510, where control of the duty cycle is achieved by varying the DELAYED ON 509 timing and the EARLY OFF 510 timing. Any of these three phase control strategies can be used to advantage when considering tradeoffs associated with controller complexity, current and voltage wave -shaping, power factor, and practical limitations of the FETs and associated circuitry. The forth cycle of FIG. 5 illustrates the case when 100% duty cycle is achieved with PROMPT ON 411 and PROMPT OFF 412.

In one embodiment, the controller 120 switches a respective pass element 110 ON at a first selected phase angle of $V_{IN}$, and OFF at a second selected phase angle of $V_{IN}$, the first and second phase angles determined by the controller 120 in order to provide a discrete amount of power to the load for purposes of maintaining a desired output voltage.

Figure 6:
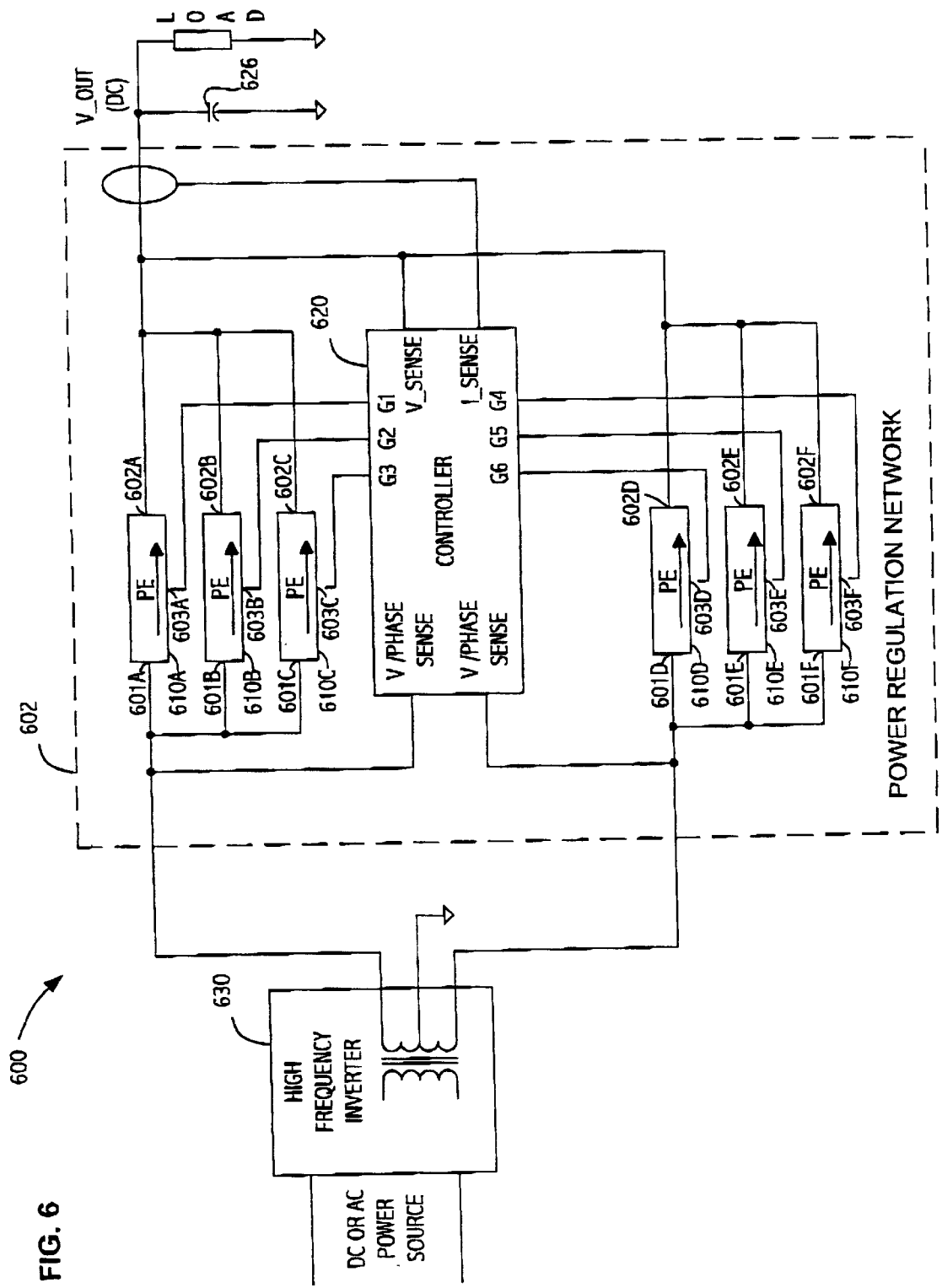
FIG. 6 is a schematic diagram of a further AC-DC phase-controlled power converter, according to another embodiment of the invention.

FIG. 6 illustrates the architecture for a high current power converter 600 with full wave rectification. It includes a high frequency inverter 630 and a power regulation network 602. The power inverter 630 converts power from a DC or AC power source into a center tapped positive high frequency AC (+HF AC) power source and a negative high frequency AC (–HF AC) power source. The power regulation network 602 is coupled to the inverter 630 to receive +HF AC and –HF AC power sources and produce a regulated DC output voltage ($V_{OUT}$) to the load at a high current. The +HF AC and –HF AC power sources are 180 degrees out of phase.

The power regulation network 602 has a controller 620, which generates control (gate) signals 603A–F applied to the respective gate of each of a plurality of pass elements 610A–F. These gate signals 603A–F determine when each pass element 610A–F is ON or OFF at any instant. The controller 620 receives measurements of the respective input and output voltages, and also senses current to the load. The controller 620 uses these measurements and sensed signals to control the ON and OFF timing of each of the pass elements 610A–F in order to achieve rectification and regulation functions. Notably, the power regulation network 602 has a circuit topology that is configured for full wave rectification. Rectification is achieved in the same way as described in FIG. 4, by sensing the voltage at the respective first and second terminals 601A–F and 602A–F of each pass element 610A–F, and requiring that the pass elements are OFF during periods when the voltage at the first terminal 601 is less than the voltage at the second terminal 602.

Regulation is achieved in a similar way to that described in FIG. 4, with separate, but symmetric pass elements for each of the +HV AC and –HV AC power sources. The pass elements coupled to the +HV AC power source use a combination of incremental regulation and phase control. The pass elements coupled to the –HV AC power source function similarly, but act 180 degrees out of phase with respect to the +HV AC power source.

FIG. 6 shows three pass elements coupled to the +HV AC power source and three symmetric pass elements coupled to the –HV AC power source. It is understood, however, that employing three pass elements is representative only, and that this number can be expanded considerably within practical limits. In addition, a skilled practitioner will appreciate that a full wave rectification bridge topology used in combination with a single sided inverter (as depicted in FIG. 4) can be easily implemented with the control strategy described above.

Figure 7:
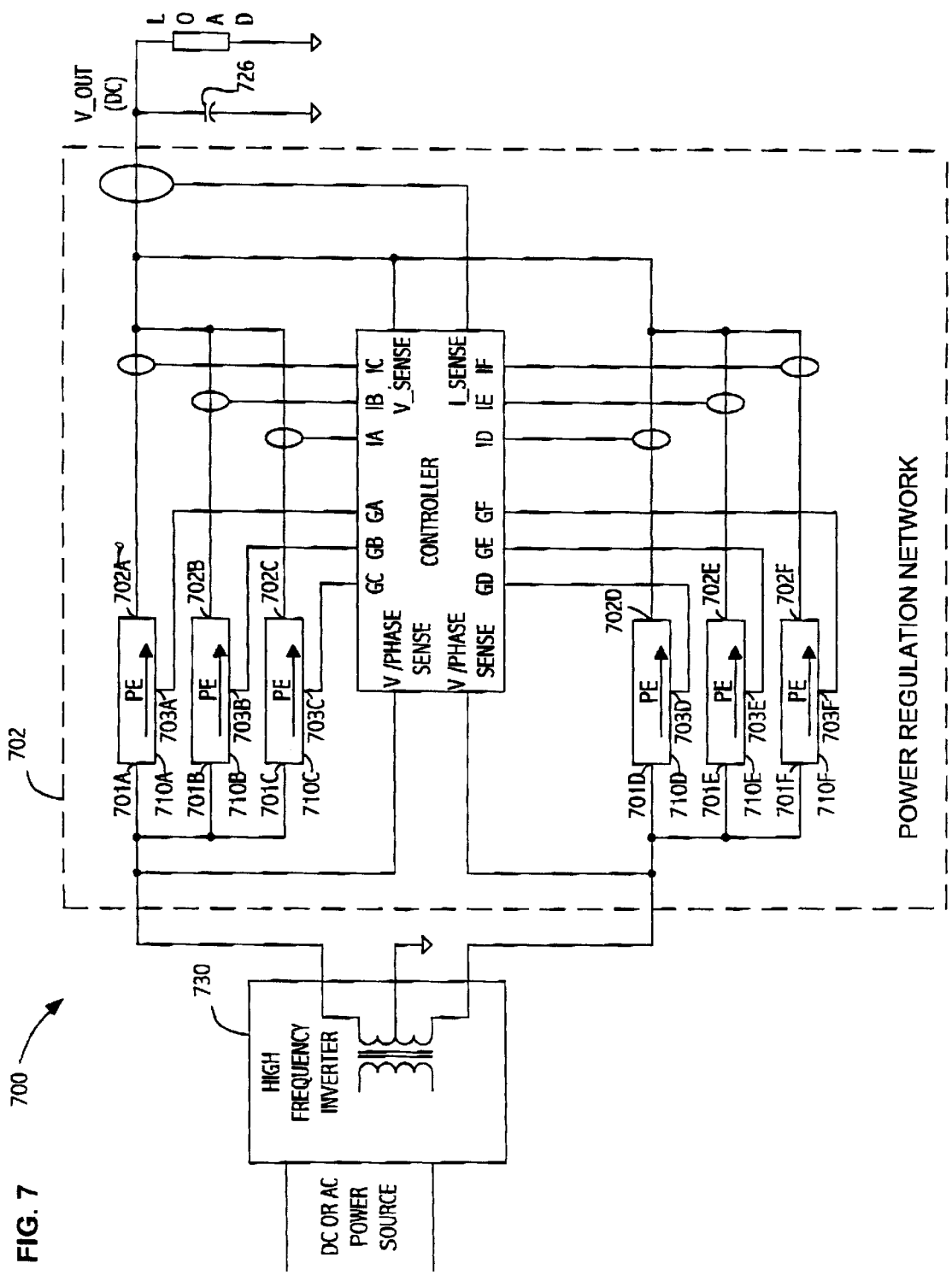
FIG. 7 is a schematic diagram of a still further AC-DC phase-controlled power converter, according to still another embodiment of the invention.

FIG. 7 illustrates an architecture 700, similar to that depicted in FIG. 6, for a high current power converter 700 with full wave rectification and current sensing for each of a plurality of pass elements 710A–F. The converter architecture 700 includes a high frequency inverter 730 and a power regulation network 702. The power regulation network 702 has a controller 720, which generates gate control signals 703A–F applied to the respective gate of each of the pass elements 710A–F. These gate signals 703A–F determine when each pass element 710A–F is ON or OFF. The controller 720 receives measurements of the input voltage, $V_{IN}$, output voltage, $V_{OUT}$, and also senses current through each pass elements 710A–F. The controller 720 uses these sensed signals to control the ON and OFF timing of each pass element 710A–F in order to achieve the rectification and regulation functions.

Rectification is achieved in the same way as described in FIG. 4, by sensing the voltage at the respective first and second terminals 701A–F and 702A–F of each pass element 710A–F, and requiring that the pass elements are OFF during periods when the voltage at the first terminal 701 is less than the voltage at the second terminal 702.

Regulation is achieved in a similar way to that described in FIG. 6 using a combination of incremental regulation and phase control. The incremental regulation function can be further improved using the current sense measurements from each of the pass elements 710A–F.

Notably, while manufacturers generally try to make the properties for each device as uniform as possible, part-to-part variations do occur. Variations in the channel resistance among the pass elements can cause one pass element to conduct a larger share of the current than other conducting pass elements having substantially the same duty cycle. By way of example, if the channel resistance for one pass element was 0.05 ohms and the channel resistance of each remaining pass element was 0.1 ohms, then current carried by the first device would be twice that carried by each of the remaining devices, causing the power dissipation of first device to be four times higher than that of the remaining devices.

From a failure and reliability standpoint, it is highly desirable for each device to share the load and power dissipation relatively equally. This can be accomplished by small variations in the 100% duty cycle used in the incremental control strategy. When sensing the current flow in individual pass elements, those devices with higher current flow will have their conduction duty cycle reduced in order to balance the average current flow for each device, thereby leveling the device-to-device power dissipation.

In various embodiments of the invention, the controller may employ a plurality of elements in the fine regulation of the output voltage, switching the respective pass elements ON and OFF independent of each other. In accordance with one aspect of such embodiments, the controller may be configured to determine the phase angles for switching the respective pass elements ON and OFF based at least in part on balancing current through the respective pass elements. In this way, phase angle switching control is employed to not only provide output regulation, but to enable more precise current sharing between respective pass elements.

Figure 8B:
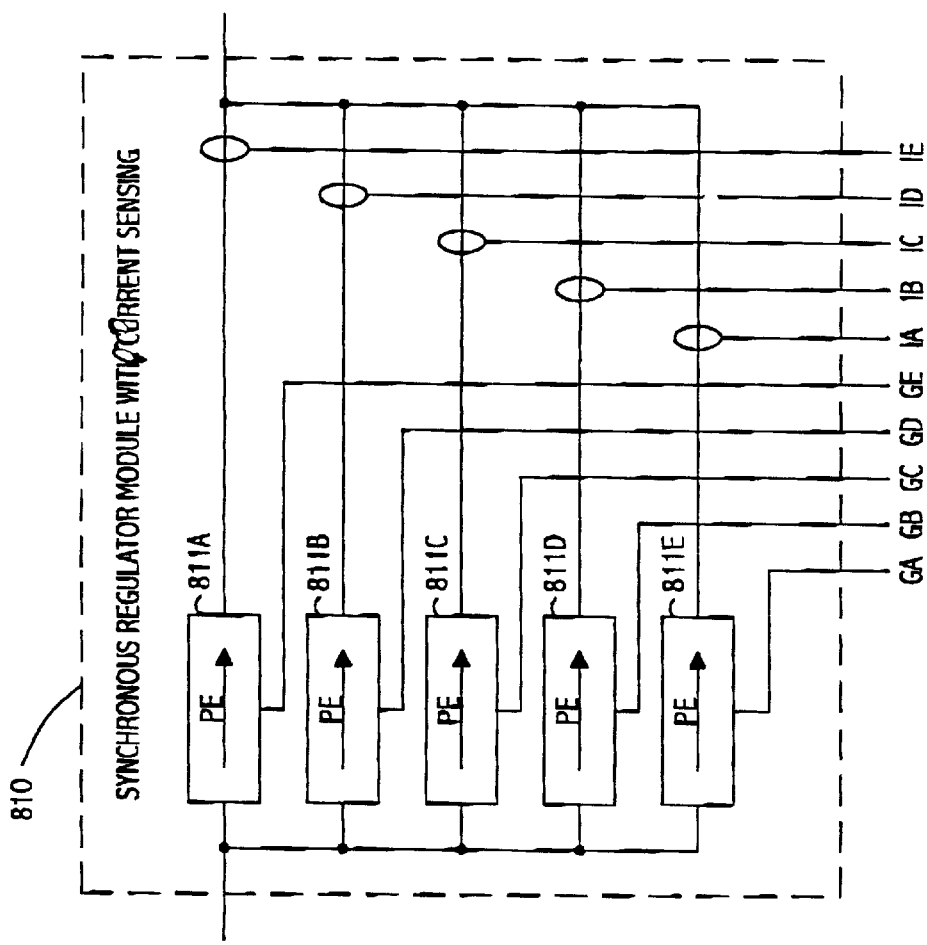
FIG. 8B is a schematic diagram of the synchronous regulator module of FIG. 8B, further comprising current sensing at the output of each pass element for use in embodiments of the invention.
Figure 8A:
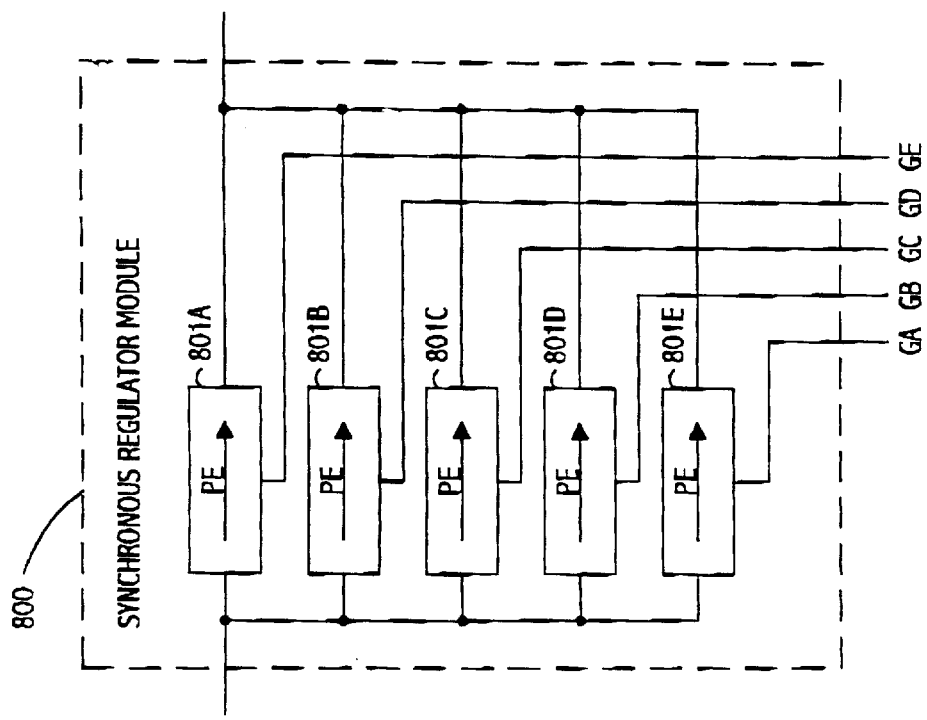
FIG. 8A is a schematic diagram of a synchronous regulator module comprising a plurality of pass elements for use in embodiments of the invention.

FIG. 8A illustrates an embodiment of a Synchronous Regulator Module (SRM) 800, comprising a plurality of paralleled pass elements 801A–D connected to, and between, a common input and a common output, each having a separate gate control signal inputs GA–E. Numerous pass elements packaged in this manner may afford several advantages over separate packaging for each pass element. For example, considerable cost reduction may be possible, for example, by bonding respective FET and gate drive dies for all of the pass elements 801A–E directly to a common mounting flange. A common mounting flange also provides close thermal coupling among the respective FET and gate drive dies, which will tend to make the temperatures at each pass element follow one another. The performance changes of individual devices caused by temperature induced drift tend to track one another, helping to maintain power balance among the devices. The possibility of failure due to phenomena such as thermal runaway is thereby reduced.

FIG. 8B shows a further embodiment of a SRM 810, which is similar to the SRM 800 in FIG. 8B, except that SRM 810 has the additional feature of providing separate output current sensing inputs IA–E for each of the respective pass elements 810A–E in the SRM 810. By taking into account the individual current output of each pass element 810A–E, the controller (not shown) of the SRM 810 can make more precise fine tuning of the input voltage phase angle switching ON/OFF timing implemented by the respective gate control inputs GA–E.

Figure 9:
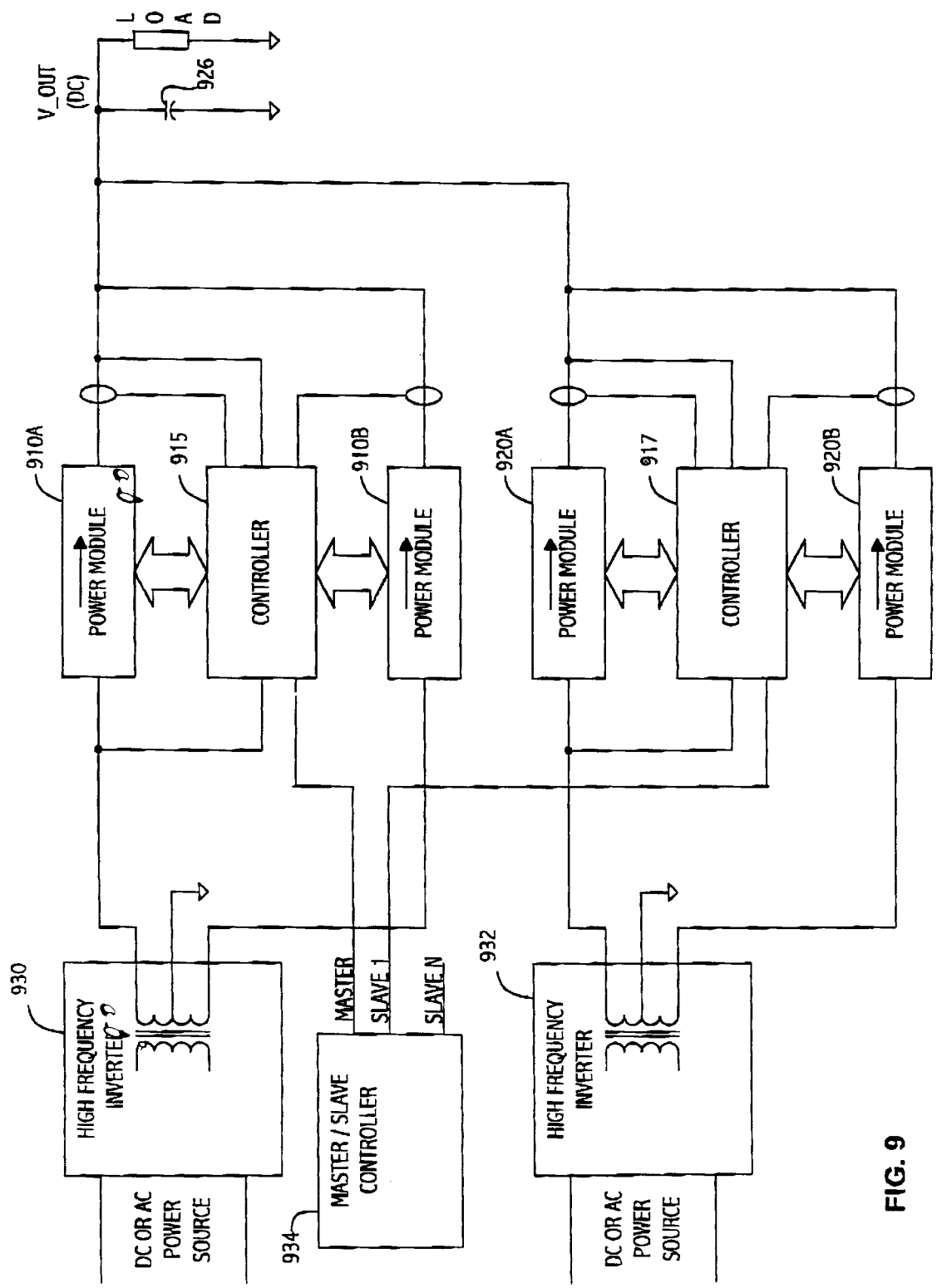
FIG. 9 is a schematic illustration of multiple AC-DC phase-controlled power converters operated by a central controller in a master-slave configuration, according to yet another embodiment of the invention.
Figure 12:
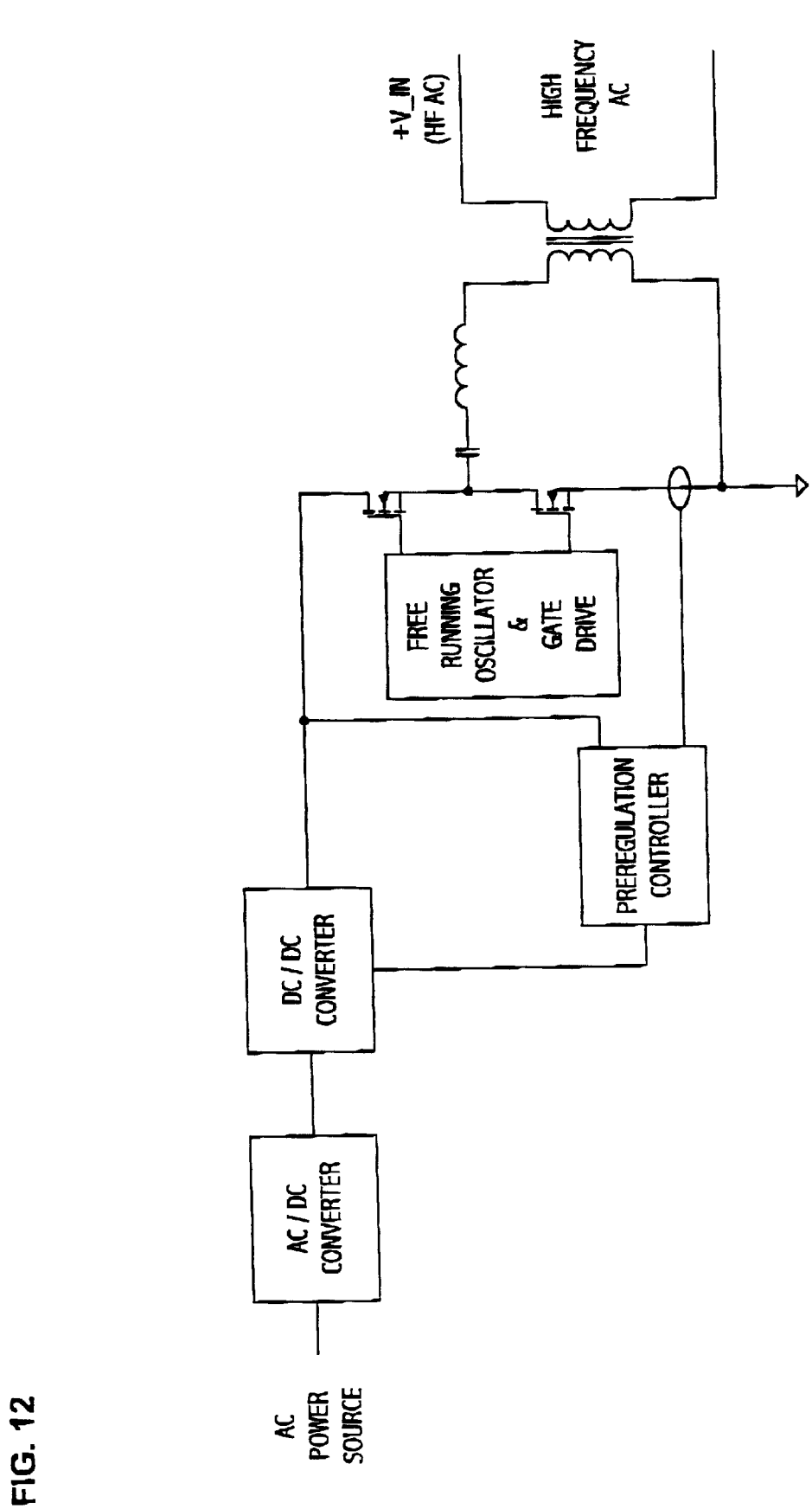
FIG. 12 is a schematic diagram of first exemplary multi-switch, isolated DC-AC inverter for use in the above embodiments.
Figure 13:
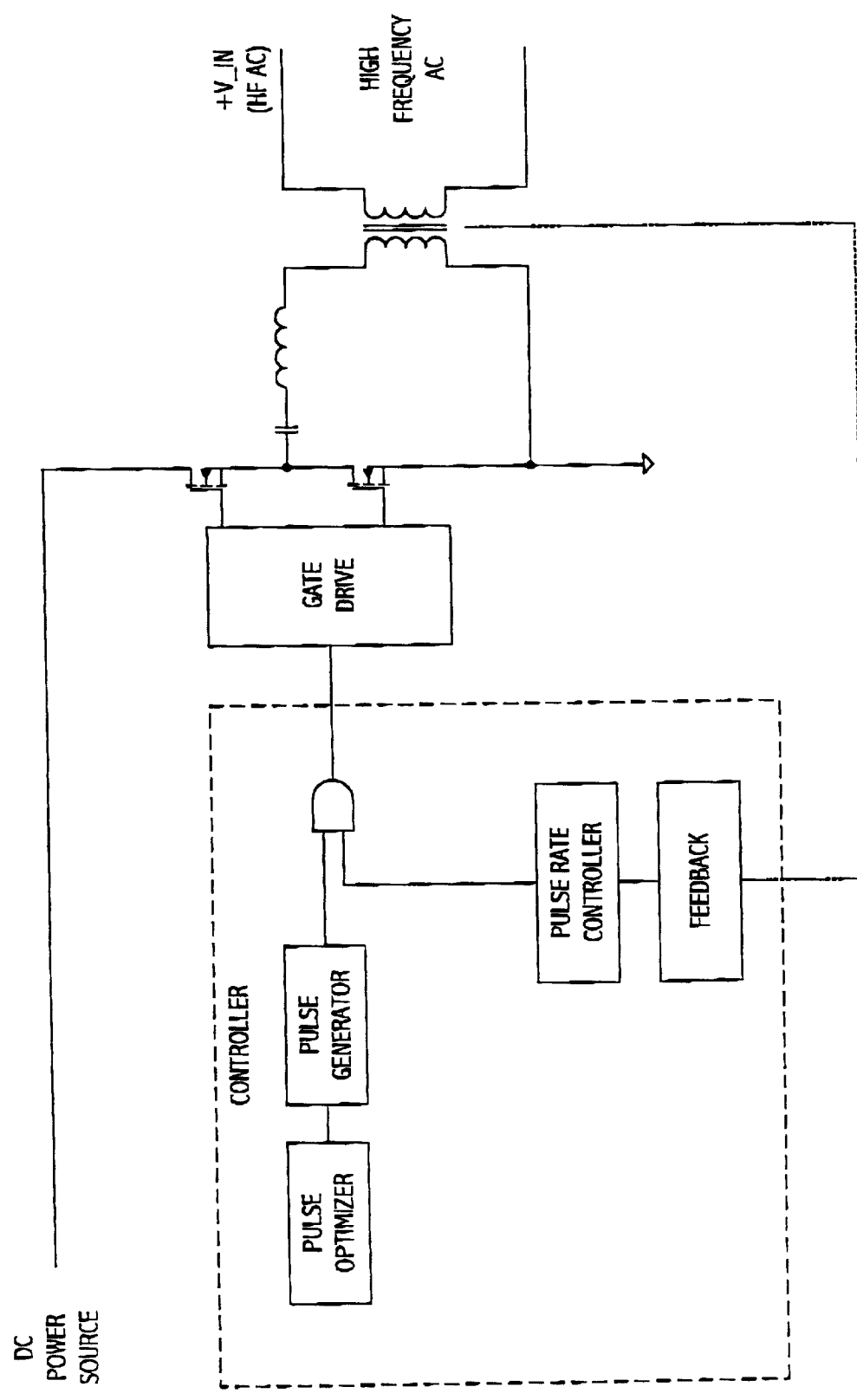
FIG. 13 is a schematic diagram of second exemplary multi-switch, isolated DC-AC inverter for use in the above embodiments.
Figure 14:
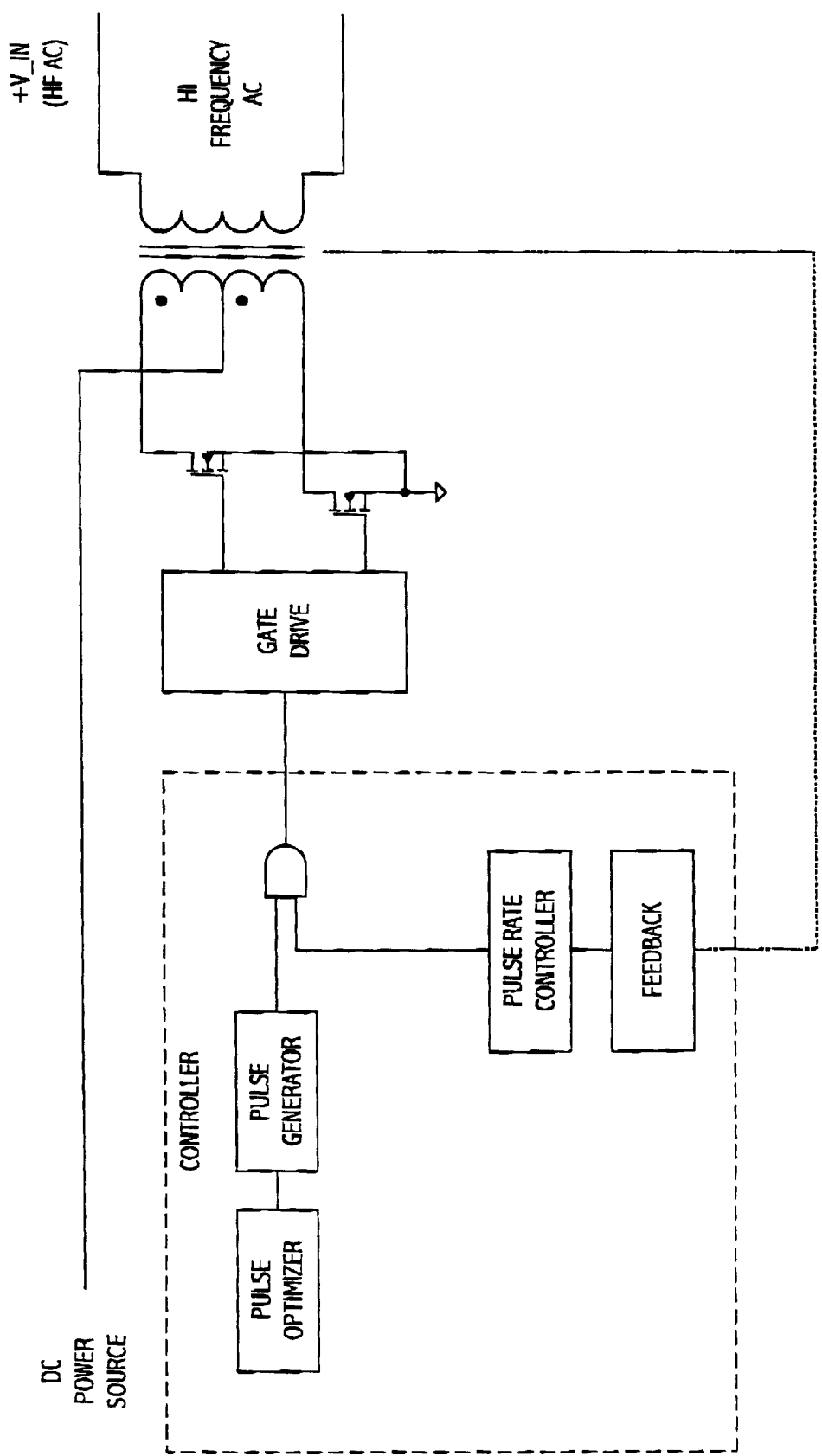
FIG. 14 is a schematic diagram of third exemplary multi-switch, isolated DC-AC inverter for use in the above embodiments.

FIG. 9 shows how two or more low voltage—high current power converters can be connected in parallel to provide additional output current capacity. In particular, a first power converter includes a hi frequency inverter 930 for converting power from a DC or AC power source into a center tapped positive high frequency AC (+HF AC) power source and a negative high frequency AC (–HF AC) power source. The +HF AC and –HF AC power sources are 180 degrees out of phase. A first power module 910A is coupled to the inverter 930 to receive +HF AC input source, and a second power module 910B is coupled to the inverter 930 to receive the −HF AC power sources. The respective power modules are preferably configured the same or similar to the exemplary power modules depicted in FIGS. 8A–B. The power modules 910A–B are controlled by a controller 915 to produce a regulated DC output voltage ($V_{OUT}$) to the load/filter cap 926 at a high current.

Controller 915 also acts as a master controller for a plurality of additional power modules 1-N, via a master/slave timing controller 934. By way of illustration, a second power converter operating in parallel with the first converter includes a hi frequency inverter 932 for converting power from a DC or AC power source into a center tapped positive high frequency AC (+HF AC) power source and a negative high frequency AC (−HF AC) power source. The +HF AC and −HF AC power sources are 180 degrees out of phase. A first power module 920A is coupled to the inverter 932 to receive +HF AC input source, and a second power module 920B is coupled to the inverter 932 to receive the −HF AC power sources. The respective power modules 920A–B are preferably configured the same or similar to the exemplary power modules depicted in FIGS. 8A–B. The power modules 920A–B are controlled by a controller 917 to produce a regulated DC output voltage ($V_{OUT}$) to the load/filter cap 926 at a high current. Notably, controller 917 is in a "slave" relationship to controller 915 via control 934. In accordance with this embodiment, both intra-power module (i.e., between respective pass elements within modules 910A, 910B, 920B and 920B), and inter-power module (i.e., between respective modules 910A, 910B, 920B and 920B) current balancing may be achieved through controlling the phase angles for switching the various pass elements in each of the power modules 910A–B and 920A–B.

FIGS. 10 through 14 show several examples of how the high frequency inverter can be implemented. In addition to multiple power modules being connected in parallel, multiple high frequency AC sources can be connected in parallel to provide scalability and redundancy. In addition, these parallel high frequency AC sources can be isolate, or non-isolated, and can be in phase or out of phase with each other. Specific operational and design details of these and other various preferred inverter embodiments are found in U.S. Pat. Nos. 6,275,018 and 6,304,473, and in co-pending U.S. patent application Ser. Nos. 09/444,032, 09/540,058, 09/970,849, which are all hereby fully and expressly incorporated by reference for all that they teach and disclose.

Accordingly, the invention is not to be restricted, except by the language of the appended claims and their equivalents.

What is claimed:

1. A power converter, comprising:
   an input;
   an output;
   a plurality of pass elements connected in parallel between the input and output, each pass element comprising a pair of series-connected, field effect transistors coupled source to source; and
   a controller coupled to the individual pass elements, wherein the controller is configured to independently switch any one or more of the pass elements ON and OFF at respective phase angles of an AC input voltage received at the input in order to regulate a DC output voltage at the output.

2. The power converter of claim 1, wherein the field effect transistors of the pass elements are operated in fully enhanced mode.

3. The power converter of claim 1, wherein the number of pass elements switched ON at a given time by the controller is based on the output voltage.

4. The power converter of claim 1, wherein the controller determines the respective phase angles for switching at least two of the pass elements ON and OFF based on balancing current through the respective two pass elements.

5. The power converter of claim 1, wherein the input voltage comprises a single phase signal.

6. The power converter of claim 1, wherein the input voltage comprises a multi-phase signal.

7. The power converter of claim 1, wherein the respective transistors of a given pass element may be separately activated.

8. A power converter, comprising:
   an input;
   an output;
   a plurality of pass elements connected in parallel between the input and output, each pass element comprising a pair of series-connected, field effect transistors operated in fully enhanced mode and coupled source to source; and
   a controller coupled to the individual pass elements, wherein the controller is configured to independently switch any one or more of the pass elements ON and OFF at respective phase angles of an AC input voltage received at the input in order to regulate a DC output voltage at the output, wherein the number of pass elements switched ON at a given time by the controller is based on the output voltage.

9. The power converter of claim 8, wherein the controller determines the respective phase angles for switching at least two of the pass elements ON and OFF based on balancing current through the respective two pass elements.

10. The power converter of claim 8, wherein the input voltage comprises a single phase signal.

11. The power converter of claim 8, wherein the input voltage comprises a multi-phase signal.

12. The power converter of claim 8, wherein the respective transistors of a given pass element may be separately activated.

13. A power converter, comprising:
    an input;
    an output;
    a plurality of pass elements connected in parallel between the input and output, each pass element comprising a pair of series-connected, field effect transistors operated in fully enhanced mode and coupled source to source, wherein the respective transistors of a given pass element may be separately activated; and
    a controller coupled to the individual pass elements, wherein the controller is configured to independently switch any one or more of the pass elements ON and OFF at respective phase angles of an AC input voltage received at the input in order to regulate a DC output voltage at the output, wherein the number of pass elements switched ON at a given time by the controller is based on the output voltage, wherein the controller determines the respective phase angles for switching at least two of the pass elements ON and OFF based on balancing current through the respective two pass elements.

14. The power converter of claim 13, wherein the input voltage comprises a single phase signal.

15. The power converter of claim 13, wherein the input voltage comprises a multi-phase signal.

16. A method of regulating power using an AC to DC converter, the power converter comprising an input, an output, and a plurality of pass elements connected in parallel between the input and output, each pass element comprising a pair of series-connected, field effect transistors coupled source to source and operated in fully enhanced mode, the method comprising:

switching a first pass element ON and OFF at first respective and second phase angles of an AC input voltage received at the input; and switching a second pass element ON and OFF at second respective phase angles of the AC input voltage, the second respective phase angles different from the first respective phase angles.

17. The method of claim 16, wherein the first pass element is switched ON at a first selected phase angle, and switched OFF at a second selected phase angle, the second pass element is switched ON at a third selected phase angle, and switched OFF at a fourth selected phase angle, the first, second, third and fourth phase angles being determined based on the output voltage.

18. The method of claim 16, wherein the input voltage comprises a single phase signal.

19. The method of claim 16, wherein the input voltage comprises a multi-phase signal.

* * * * *